United States Patent [19]

Anderson, Jr.

[11] 3,731,843

[45] May 8, 1973

[54] GAS SOURCE

[75] Inventor: Carl W. Anderson, Jr., Springfield, Va.

[73] Assignee: The Susquehanna Corporation, Alexandria, Va.

[22] Filed: June 10, 1971

[21] Appl. No.: 151,661

[52] U.S. Cl. ............222/3, 222/386.5, 280/150 AB
[51] Int. Cl. .............................................B67d 7/24
[58] Field of Search........................222/3, 5, 386.5; 280/150 AB; 9/319, 320, 322, 324, 325, 326

[56] References Cited

UNITED STATES PATENTS

| | | | |
|---|---|---|---|
| 3,180,373 | 4/1965 | Hebenstreit | 222/5 UX |
| 3,483,695 | 12/1969 | Olsen | 222/386.5 X |
| 2,816,419 | 12/1957 | Mueller | 222/3 X |
| 2,980,177 | 4/1961 | Glasson | 222/386.5 X |

*Primary Examiner*—M. Henson Wood, Jr.
*Assistant Examiner*—John J. Love
*Attorney*—Burton L. Lilling et al.

[57] ABSTRACT

An embodiment of the gas source is disclosed which uses a compressed gas cylinder whose interior is divided into two chambers by a folded bladder. One chamber is a storage chamber for the compressed gas and the other is a combustion chamber for housing and burning a solid propellant. When the discharge valve is opened, a gas pressure pulse is applied from the storage chamber to a pressure-responsive spring in the propellant ignition system. The ignition system functions to ignite the propellant and cause the generation of gases. These gases act upon the bladder causing it to unfold as the compressed gas is discharged. The generation of gas is tailored to cause the compressed gas within the storage chamber and thereby the discharge pressure to remain essentially constant.

9 Claims, 3 Drawing Figures

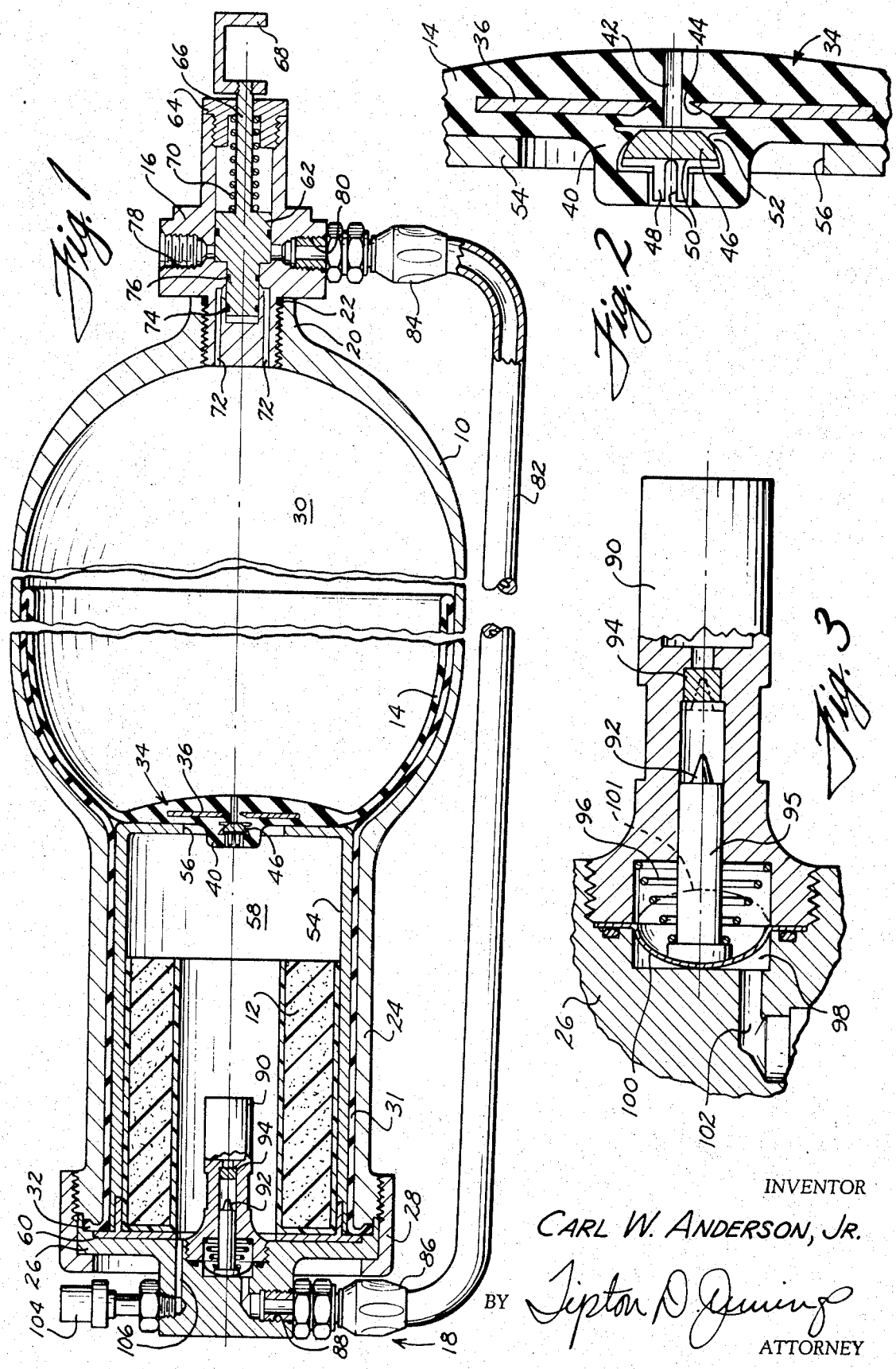

GAS SOURCE

BACKGROUND OF THE INVENTION

The present invention relates to a pressurized gas source, and more particularly to a gas source suitable for use in inflating inflatable devices.

Heretofore, it has been the practice to use as a gas source for inflatable devices cylinders filled with pressurized air or gas or, alternatively, with liquefied gases such as liquefied carbon dioxide. The inflatable devices must often be erected under emergency conditions as they include such apparatus as life rafts, escape chutes, emergency shelters, body-cushioning devices, and the like. One problem with using pressurized gas is that the storage pressure is very sensitive to the surrounding temperature conditions and additionally, the pressure declines during use as the volume of the stored gas decreases. On the other hand, when liquefied gas is used and introduced rapidly into a relatively large inflatable device, the gas is at a very low temperature. The result of using such prior art gas sources is that a full inflation of the inflatable device cannot generally be attained or assured within the short period of time provided in an emergency.

It has been proposed that propellants be incorporated in the gas source so that the hot, gaseous, combustion products mix with and gasify the liquefied gas prior to admitting it to the inflatable. A somewhat similar approach uses the generated gas first to expel the liquid under pressure from its chamber and then to mix with the liquid to vaporize it just prior to expulsion from the gas source. In either case, while improved inflation may result, the products of combustion and/or mixing are at least in part highly corrosive and can permanently damage the inflatable structure as well as the cylinders and auxiliary components such as valves and aspirators, or render such apparatus unsuitable for reuse. An additional problem is that ignition of the propellant is usually attained by means of an electrical impulse or a spring-biased firing pin, which lends itself both to the hazards of premature ignition and reliability deficiencies.

SUMMARY OF THE INVENTION

The present invention is directed to an improved gas source in which a separate gas generator or propellant grain is burned to maintain the stored gas at an essentially constant discharge pressure; however, the combustion products do not contact or mix with the pressurized stored gas which is being discharged. A novel ignition system is responsive to the pressure of the stored gas and ignites the propellant only upon commencement of gas discharge.

It is an object of the present invention to provide an improved gas source having an ignition sequence for its gas generator which is safe and reliable.

It is another object of the present invention to provide such a gas source in which the stored gas is discharged at an essentially constant pressure, thereby assuring rapid inflation and hardening when applied to an inflatable device.

It is a further object of the present invention to provide such a gas source in which the products resulting from combustion of the gas generator are not discharged or mixed with the stored gas but are retained within the gas source housing.

A still further object of the present invention is to provide such a gas source which in operation does not damage or render unsuitable for reuse the inflatable structure or its associated apparatus which is contacted by the discharged gas.

Still another object of the present invention is to provide a rapid, non-electric, reliable pyrotechnic initiation of the gas generator by application of a high pressure gas pulse at the commencement of gas discharge.

Other objects and advantages of the present invention will become apparent from a reading of the following specification in conjunction with the accompanying drawings.

BRIEF DESCRIPTION OF THE DRAWINGS

FIG. 1 presents a longitudinal cross-sectional view of the preferred embodiment of the present invention;

FIG. 2 is an enlargement in cross-section of a portion of FIG. 1; and

FIG. 3 is an enlargement in cross-section of another portion of FIG. 1.

DESCRIPTION OF THE PREFERRED EMBODIMENT

With reference now to FIG. 1 showing a longitudinal cross-sectional view of the preferred embodiment of the present invention, there is shown a gas source consisting of five primary components. These components are a compressed gas storage tank or cylinder 10, a gas-generator or propellant grain 12, a bladder 14, a gas outlet valve 16, and a gas generator ignition system identified generally by the arrow 18.

The cylinder 10 is of a generally elongated cylindrical construction and is preferably made of steel or other material of a sufficient strength to withstand the high pressure of the gas which is stored therein. One end of cylinder 10 is in the shape of a hemisphere which terminates into boss 20. This boss is internally threaded to receive and mate with valve 16. O-ring 22 provides a seal between the boss 20 and valve 16 to seal this end of cylinder 10. At the opposite end of cylinder 10 there is an elongated neck portion 24 of reduced diameter. Neck 24 is closed by closure 26 which is secured by retaining collar 28. Retaining collar 28 is threaded to mate with the threaded end of neck 24.

Bladder 14 is installed within cylinder 10 in a folded condition as shown. This arrangement defines a chamber 30 for the pressurized gas. Bladder 14 serves the dual purpose of expelling the stored gas from chamber 30 and containing the gases and other combustion products generated by the burning of propellant grain 12. In the latter regard, bladder 14 functions as a barrier to the passage of combustion gases and other products into the pressurized gas chamber 30. The bladder material is preferably one which will resist the vapors and gases produced during propellant burning. It has been found that butyl rubber is an excellent candidate, although it is obvious that other types of materials can be used.

Bladder 14 includes a neck portion 31 which is sized to fit against the inside of neck 24 of cylinder 10. The end of bladder neck 31 is provided with an annular flange 32 which is tightly clamped between closure 26 and neck 24. This arrangement provides a seal at the neck end of cylinder 10 and also prevents any shifting of the bladder within the cylinder."

As can be visualized, the bladder 14 in an unfolded state would be of the same general shape as the interior of cylinder 10. The bottom of this bladder, which in the folded position shown is adjacent the neck 31, is closed by a thickened portion indicated by the numeral 34. This portion 34 is stiffened or reinforced by a metal plate 36. FIG. 2 shows an enlargement in cross-section of the construction details of this end of the bladder. The thickened portion 34 of bladder 14 is shown as having a hollow boss 40 centrally formed thereon. A passageway 42 provides communication between the chamber 30 and the cavity of boss 40. A hole 44 is formed in plate 36 to accommodate passageway 42.

A small check valve 46 resides within the cavity of boss 40. Check valve 46 is in the general shape of a flattened hemisphere having a central boss 48. Two notches 50 are cut transversely across the boss 48 at right angles to one another and partly into the hemispherical portion of valve 46. Valve 46 rests on a flexible annular shoulder 52 formed within boss 40. The purpose of check valve 46 is to permit the pressurized gas within chamber 30 to flow through the bladder wall and balance the pressure in the combustion chamber with that within chamber 30. The flow path of the gas is through passageway 42, between the valve 46 and shoulder 52, through the notches 50 and into the combustion chamber. When the propellant 12 is ignited during the operation of the invention as later described, the increased pressure in the combustion chamber forces valve 46 down against portion 34 of bladder 14 to seal passageway 42 and thereby check or prevent the flow of combustion gases into chamber 30.

With reference again to FIG. 1, a cup-shaped member 54 is mounted in the neck 24 of cylinder 10. The bottom of cup 54 abuts the thickened portion 34 of bladder 14 and has a central opening 56 through which boss 40 extends. The outer cylindrical surface of cup 54 contacts bladder neck 31. The interior of cup-shaped member 54 defines a combustion chamber 58 and includes the propellant grain 12 which is mounted therein.

Gas generator 12 is shown here as being a solid propellant grain having a central perforation and being inhibited at its center port and periphery to provide for end-burning; however, other grain designs can be employed as dictated by desired burn time or mass flow of generated gas. The propellant grain 12 can be composed of any of a number of compositions well-known in the published art, and is preferably designed to provide a constant mass flow of generated gas over its burn time. In operation, this generated gas worked to displace the discharged high-pressure stored gas by a constant-pressure volume-displacement process. An example of a suitable solid grain is a cast plastisol propellant composed primarily of an ammonium perchlorate oxidizer, polyvinyl chloride binder, and an organic ester plasticizer; however, other propellant compositions are equally suitable.

Cup-shaped member 54 is secured to an end cap 60 which has a central aperture to accommodate a portion of the ignition system 18 as later described. Cap 60 is formed with an overhang sized to fit under closure 26, thereby to retain cup-shaped member 54 within the neck 24 of cylinder 10.

At the opposite end of cylinder 10, the outlet valve 16 includes a piston 62 mounted for translational motion within the valve's hollow interior. Valve 16 is closed by a threaded cap 64. Valve stem 66 is formed as an extension of piston 62 and extends through cap 64. A handle or trigger 68 is threaded onto the end of stem 66. Piston 62 is normally biased into the position shown by the force of a small spring 70 positioned between the bottom of this piston and the inside of cap 64.

At the end of the valve 16 which mates with boss 20 of cylinder 10, there are formed a plurality of passageways 72. These passageways are designed to provide a flow path for the pressurized gas from the chamber 30 into the interior of valve 16 and then out of the gas source. However, when the piston 62 is in the normally closed position shown, the flow of this high pressure gas is blocked by the piston. A pair of O-rings 74 and 76 prevent leakage of this gas around piston 62.

Valve 16 is provided with two outlet ports 78 and 80. When piston 62 is in the open position, both ports are in open communication with the interior of the valve. Port 78 is designed to discharge the stored gas from the gas source. Port 80 is designed to supply a high-pressure gas pulse to the ignition system 18. Both ports are preferably threaded as a convenience for the attachment of fittings.

The ignition system 18 includes a hose 82 which extends from the valve 16 to closure 26 at the opposite end of cylinder 10. Hose 82 is connected by conventional adapters 84 and 86, respectively, to port 80 of valve 16 and to a similar port 88 formed in closure 26.

With reference now to the enlargement of FIG. 3, a better understanding of the construction details of the remainder of ignition system 18 can be gained. An igniter assembly 90 is threaded into the bottom of closure 26 and extends into the propellant chamber 58 within the perforation of grain 12. The igniter itself can be a conventional composition which is ignited when firing pin 92 impacts upon percussion cap 94. Firing pin 92 is carried by piston 95 which is held in the cocked position by a small spiral spring 96.

As shown in this figure, both the igniter assembly 90 and the closure 26 by their respective removed portions form a chamber 98 which houses the upper end of piston 95 and the spiral spring 96. A domed spring 100 is soldered at its edges to igniter assembly 90 and assumes the position shown within chamber 98 with the head of piston 95 abutting the underside of this domed spring. This arrangement divides compartment 98 into upper and lower sections which are sealed off from one another by virtue of domed spring 100. Domed spring 100 is designed to remain as shown until the pressure on its convex face exceeds a predetermined level at which time it will pop or snap into a reversed position, as depicted by the phantom showing 101. Such action, of course, will drive piston 95 downwardly and thereby cause pin 92 to strike the percussion cap 94. The application of pressure to chamber 98 and spring 100 is through passageway 102 which is formed in closure 26 and communicates with port 88.

Returning to FIG. 1, closure 26 also carries a conventional purge valve 104 which communicates with chamber 58 by means of passageway 106. Purge valve 104 is operated after discharge of the stored gas from chamber 30 so that the high pressure combustion gases can be purged prior to disassembly of the apparatus for cleaning and refurbishment.

Prior to using the gas source, the chamber 30 of cylinder 10 is filled with gas to the desired pressure. As an example, a cylinder of the type here shown and described has been filled with 8 pounds of nitrogen at 3,000 psi. Within cylinder 10, this pressurized gas flows from chamber 30 through passageway 42 and around check valve 46 into combustion chamber 58 where it pressurizes all exposed components to this same pressure level. Exhaust port 78 of valve 16 is connected to the device to be inflated or to an auxiliary apparatus such as an aspirator designed to use the high pressure gas to entrain large volumes of ambient air into the inflatable device.

To operate the gas source, trigger 68 is pulled to the right, with reference to FIG. 1, sufficiently to overcome the retarding effect of spring 70. Piston 62 is likewise moved to the right, thereby uncovering the interior apertures of passageways 72. The piston 62 is then driven by gas pressure the remainder of its travel to its fully opened position where it abuts the inside face of cap 64. Ports 78 and 80 are now in open communication with the gas stored in chamber 30, and this gas is discharged from port 78 at a high mass flow rate to the inflatable device.

Only after valve 16 is opened and gas discharge commences can ignition of propellant grain 12 occur. A surge of high pressure gas is delivered out of port 80 through hose 82, port 88 of closure 26, and passageway 102 to the convex face of domed spring 100. This spring abruptly reverses its dome-shape and drives firing pin 92 of piston 95 into the percussion cap 94. This ignites the igniter composition and thereby the solid propellant grain 12. The pressure within chamber 58 is already at the elevated pressure of the gas stored in chamber 30. Therefore, as the propellant grain 12 begins to burn, the generated gas causes an immediate increase in pressure in chamber 58 over that stored in cylinder 10. Check valve 46 in bladder 14 closes, and the generated gas acts upon the thickened portion 34 of the bladder to cause it to begin unfolding.

The propellant grain 12 is designed to produce a warm gas at a volumetric rate equal to the volumetric flow rate of the stored gas out of chamber 30. Thus, as the stored gas is discharged, it is displaced by the generated gas. This causes a continuous and progressive unfolding of bladder 14 within cylinder 10 so that the operational pressure of the stored gas within cylinder 10 throughout inflation remains substantially constant at its original pressure level, e.g., 3,000 psi, without the need for any mechanical regulation. This constant-pressure, volume-displacement process continues until all of the stored gas has been discharged from the gas source. At this point, the bladder has completely unfolded and lines the interior of cylinder 10 with the thickened portion 34 abutting the hemispherical end of this cylinder adjacent boss 20.

The propellant grain 12 is designed to be completely consumed at this point, and burning ends. All gas which has been generated by the burning of grain 12 is trapped within cylinder 10, and no mixing with or contamination of the pressurized gas which was stored within the cylinder has occurred. When desired, the purge valve 104 can be opened to release this gas.

Having thus described the invention, it is clear that the objects as stated have been obtained in a simple and practical manner. Although the gas source of the present invention has been specifically described with reference to an inflation system, it is to be understood that it has general utility and may be used in other types of installations which would require a gas supply of the type disclosed. While a particular embodiment of the gas source has been shown and described, it is to be understood that changes may be made in the construction, composition, and arrangement of various parts thereof without departing from the spirit and scope of the present invention as defined by the appended claims.

What is claimed is:

1. A gas source comprising:
   a. storage means for containing a pressurized gas,
   b. a gas generator for supplying combustion gas to said storage means to aid in the discharge of pressurized gas from said storage means and
   c. an ignition system for said gas generator including:
      1. an igniter,
      2. means responsive to the gas pressure within said storage means for actuating said igniter, and
      3. means for applying said pressure to said actuating means upon commencement of gas discharge from said storage means.

2. A gas source as claimed in claim 1 further comprising:
   a. a gas barrier for separating the combustion gas in said storage means from the pressurized gas,
   b. said gas barrier being movable to aid in said discharge of pressurized gas.

3. A gas source as claimed in claim 2 wherein said gas barrier is a folded bladder which is designed to unfold in said storage means during operation upon application of combustion gas against one side.

4. A gas source as claimed in claim 3 wherein:
   a. said storage means includes:
      1. a combustion chamber which houses said gas generator, and
      2. a chamber which contains said pressurized gas, and
   b. said bladder separates said combustion chamber from said pressurized gas chamber.

5. A gas source as claimed in claim 4 further comprising a check valve for said bladder, said check valve permitting gas to flow from said pressurized gas chamber to pressurized said combustion chamber, but blocking flow of combustion gas from said combustion chamber to said pressurized gas chamber.

6. A gas source as claimed in claim 1 wherein said actuating means includes:
   a. a pressure-responsive spring,
   b. a firing pin mechanically responsive to movement of said spring, and
   c. percussion means designed to be actuated by said firing pin to ignite said igniter and thereby said gas generator.

7. A gas source as claimed in claim 4 wherein said actuating means includes:
   a. a pressure-responsive spring,
   b. a firing pin mechanically responsive to movement of said spring, and
   c. percussion means designed to be actuated by said firing pin to ignite said igniter and thereby said gas generator.

8. A gas source as claimed in claim 7 further comprising:

a. an outlet valve connected to said storage means,
b. a discharge port formed on said outlet valve,
c. a second port formed on said outlet valve, and
d. wherein said ignition system further includes a hose connected between said second port and said actuating means to provide a path for the application of gas pressure from said storage means to said pressure-responsive spring.

9. A gas source as claimed in claim 8 wherein:
a. said storage means is a cylinder of a generally cylindrical shape and has a neck portion of reduced diameter,
b. said neck portion housing said gas generator and said ignition system, and further comprising:
c. a closure for said neck,
d. said closure having a port in communication with said pressure-responsive spring,
e. said hose being connected to said port.

* * * * *